Aug. 21, 1956  J. C. FAULKNER  2,759,815
AERIAL ALIGNMENT SHEETS AND METHODS OF MAKING SAME
Filed March 2, 1953  3 Sheets-Sheet 1

James C. Faulkner
INVENTOR.
BY
ATTORNEYS

Aug. 21, 1956   J. C. FAULKNER   2,759,815
AERIAL ALIGNMENT SHEETS AND METHODS OF MAKING SAME
Filed March 2, 1953   3 Sheets-Sheet 2

James C. Faulkner
INVENTOR.

BY Vincent Martin
and
Joel E. Edwards
ATTORNEYS

Aug. 21, 1956  J. C. FAULKNER  2,759,815
AERIAL ALIGNMENT SHEETS AND METHODS OF MAKING SAME
Filed March 2, 1953  3 Sheets-Sheet 3

James C. Faulkner
INVENTOR.
ATTORNEYS

United States Patent Office 2,759,815
Patented Aug. 21, 1956

2,759,815

AERIAL ALIGNMENT SHEETS AND METHODS OF MAKING SAME

James C. Faulkner, Shreveport, La.

Application March 2, 1953, Serial No. 339,870

4 Claims. (Cl. 95—5)

This invention relates to new and useful improvements in aerial alignment sheets and methods of making same.

The term "alignment sheet" has been applied to line drawings in use for many years by various industries, particularly those industries engaged in the cross-country construction of pipelines, highways, railroads, electric transmission lines, telephone lines, and like facilities having the problem common to all—that is, the absolute necessity of being able to represent pictorially the relation of the proposed construction route to the terrain existing upon the ground over which the said construction is intended to be installed.

The logical beginning of such a cross-country construction (for simplicity of explanation we shall hereinafter assume such construction to be a pipeline installation) is to locate pictorially the proposed construction area on a map. Commonly, the maps which are used are those made by distortion of the curved surface of the earth into a flat plane, usually by either the Mercator, Lambert, or Polyconic methods of projection.

Once the proposed route has been determined by viewing the map, field survey parties are sent out into the field to observe the terrain and report any obstructions that may require relocation of the pipeline right-of-way, because of situations that could not be detected upon the flat-plane map prior to the actual field trip. With the most accurate instruments available, a measurement is made along this proposed route, with every possible point of intersection with existing railroads, highways, fence lines, waterways, etc., noted so that each can be checked against road maps, property ownership records, and any other existing data that can be utilized to assist in the adjustment and recalculations common to this method of operation. Thereafter the information acquired by the field survey parties is submitted to draftsmen who plot the position of the proposed pipeline upon sheets of tracing paper to obtain the preliminary alignment sheets.

By the use of these alignment sheets, the personnel engaged in the acquisition of rights-of-way are sent to contact the persons whose properties are to be crossed in an attempt to obtain the rights of ingress and egress necessary for the construction, maintenance and repair of the pipeline. During the process of procuring rights-of-way, it is normally anticipated that further relocations will be required. When relocations are required, it is necessary for survey parties to return to the points of relocation for further observation of the terrain and further adjustment and recalculation of the measurement of the pipeline. The foregoing procedure must often be repeated numerous times before the selection of the proposed route of the pipeline has been brought to its final stage.

Even after the final adjustments have been agreed upon and posted by the draftsmen on the alignment sheets, it is necessary for the survey parties to again return to the field after the completion of the construction in order to make a final and complete survey from the beginning to the end of the pipeline so that the operating company will be possessed of a permanent record of the location of all facilities installed. All of the information acquired from the field parties must be applied to the alignment sheets by the draftsmen by the use of mathematical calculation and personal interpretation of information in lieu of a true and exact picture of the ground surface traversed by the pipeline.

Obviously, the above procedure which is commonly used today, is costly due to its numerous repetitions in the work, and is not highly accurate due to the necessary interpretations and the lack of a true picture of the ground surface over which the pipeline is laid.

In recent years, some of the difficulties of the above procedure have been overcome by using aerial or topographic photographs as a supplement to the above methods. Various methods of using the aerial or topographic photographs have been attempted, an example of which is illustrated in the United States Patent No. 2,291,683, issued to Z. J. Boothe, Jr., on August 4, 1942. In the patent to Boothe, there is disclosed the use of a booklet wherein an aerial or topographic photograph is utilized with overlay sheets which carry all of the line work and notations made by the draftsmen. Although the plat book arrangement of Boothe may be satisfactory for some purposes, there are certain disadvantages which prevent such an arrangement from being practical in cross-country construction, such as the laying of a pipeline. In the first place, large numbers of prints are needed for distribution to all personnel concerned, sometimes literally hundreds of copies. With the arrangement of Boothe, both the aerial photographs and the overlay sheets have to be reproduced because if only the overlay sheets are reproduced, then the survey crews and the personnel involved in the acquisition of the rights-of-way have only the line work on the transparent material which would actually provide no more information than the old plotting method described above. If the aerial photograph is also reproduced, the expense of such reproduction is so great that the use of the plat book becomes prohibitive. In other words, if both the aerial photograph and the overlay sheets are reproduced, the expense is so great that the old plotting method described above might as well be used. Furthermore, the use of the overlay sheets necessitates accurate alignment of the overlay sheets on the aerial photograph, and any error in such alignment automatically results in an error in interpretation. Therefore, from a practical standpoint the use of a plat book arrangement such as disclosed in Boothe is impossible where multiple copies are required.

It is therefore an object of this invention to provide an improved alignment sheet and method of making same, wherein an aerial or topographic photograph is utilized as the geographic base with survey data and other line work being incorporated with the photograph so that multiple copies of the alignment sheet can be reproduced accurately and economically.

An important object of this invention is to provide an improved alignment sheet and method of making same, wherein the alignment sheet is a composite single sheet having thereon an aerial photograph and survey data and other line work, with the composite single sheet being so formed that changes may be made in the survey data and other line work without damaging the aerial photograph, and such composite single sheet being capable of reproduction by conventional methods such as by blueprinting.

Another object of this invention is to provide an improved alignment sheet and a method of making same, said improved alignment sheet being a developed photographic negative having on one side thereof an aerial photograph, the other side of the negative being an ink-receiving surface upon which survey data and other information is inked, whereby the inked data and other information can be readily removed or changed without damaging the photograph side of the negative.

A further object of this invention is to provide an improved alignment sheet and a method of making the same, wherein a master negative is made having thereon the title block, data columns, legends, and other information which is standard for all alignment sheets, and then a photographic negative is exposed to such master sheet, and thereafter an aerial photograph is exposed to the same photographic negative sheet, so that the photographic negative sheet has both the aerial photograph and the information from the master negative thereon.

The construction designed to carry out the invention will be hereinafter described together with other features thereof.

The invention will be more readily understood from a reading of the following specifications and by reference to the accompanying drawings forming a part thereof, wherein an example of the invention is shown, and wherein.

Figure 4:
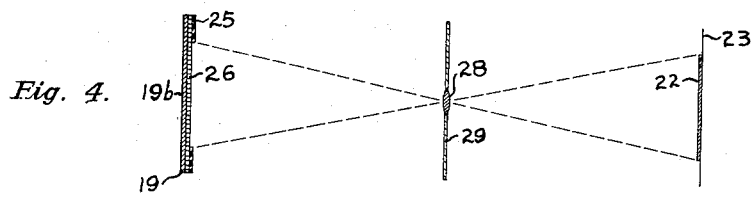
Figure 4 is a view which diagrammatically illustrates the photographic projection of an aerial photograph onto the photographic negative which has previously been exposed by the step illustrated in Figure 3.
Figure 5:
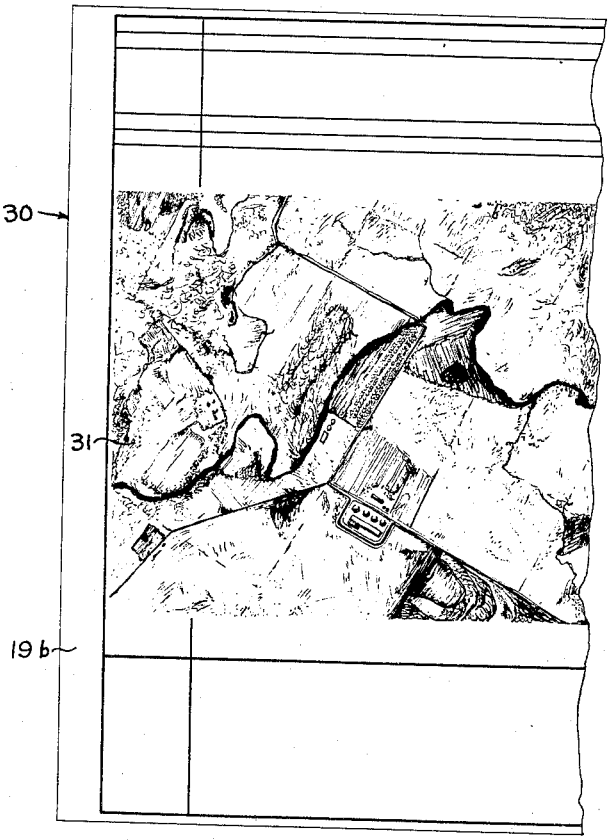
Figure 5 is a view of a portion of the photographic negative after it has been exposed as illustrated in Figures 3 and 4 and then developed.
Figure 6:
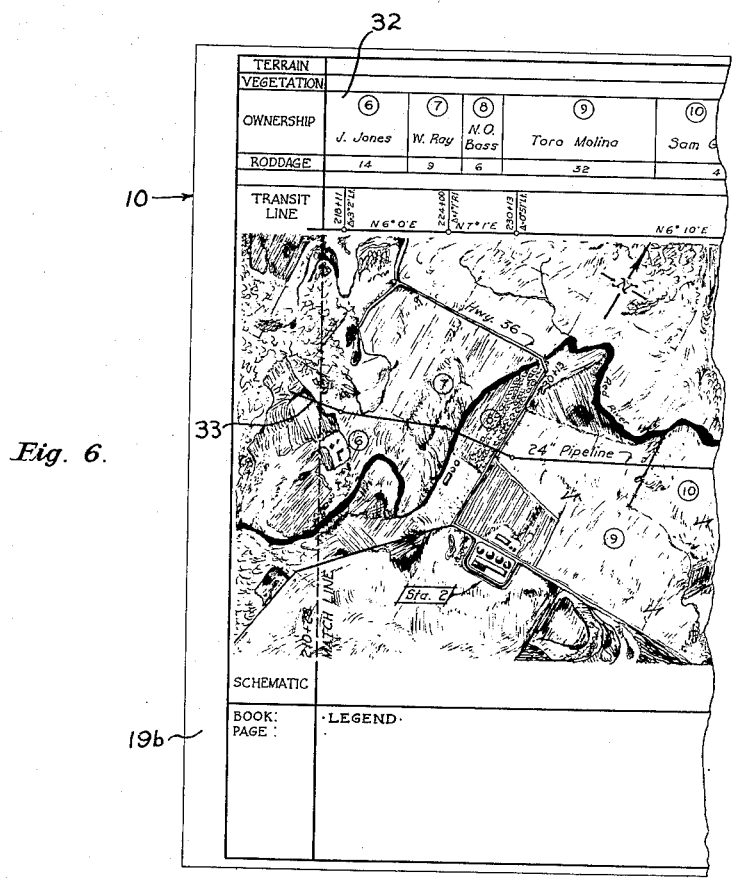
Figure 6 is a view similar to Figure 5 but illustrating a portion of the completed aerial alignment sheet of this invention after survey data and other information have been placed on the developed negative with ink.

In Figures 1–6, the steps and various phases in the process of producing the improved alignment sheet 10 illustrated in Figure 6 are shown. In order to distinguish the alignment sheet 10 from the previously known alignment sheets of the prior art, the alignment sheet will be herein referred to as "aerial alignment sheet."

Figure 1:
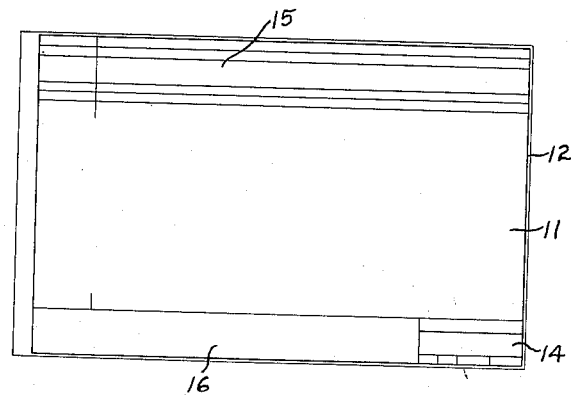
Figure 1 is a view of a sheet of material having thereon the title block, data columns, and other information in ink, such information being common to all of the alignment sheets produced by the method of this invention.
Figure 2:
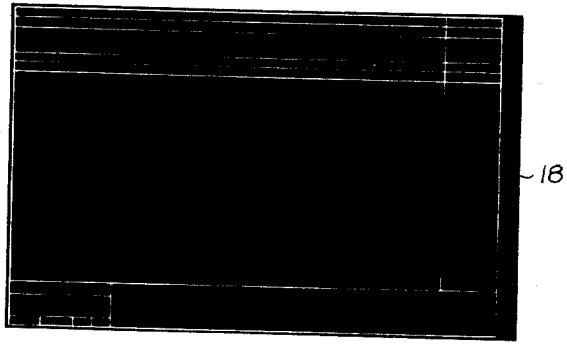
Figure 2 is a view illustrating a developed negative or master copy of the inked sheet illustrated in Figure 1.

In carrying out the methods of this invention to produce the aerial alignment sheet 10 the first step is to produce a master copy having thereon the border, title block, data columns, legends, symbols, and any other information which is to be standard for all and common to each aerial alignment sheet to be produced. The steps for obtaining such master copy are illustrated in Figures 1 and 2. First on the sheet of transparent or opaque material 11, a draftsman inks a border 12, a title block 14, data columns 15 and 16 and such other legends, symbols or other information which is standard to all aerial alignment sheets used for any particular purpose such as the construction of a pipeline. For clarity, the legends, symbols and other information have been omitted from Figure 1. The material 11 may be any standard transparent film, drafting paper, or any other material which may or may not be opaque. The inking is preferably done with India ink, although it will be appreciated that other types of ink may be used so long as the ink adheres to the material 11 and is of a contrasting color.

After the ink lines have been placed on the sheet of material 11 (Figure 1), then a full-size film negative of the drawing is made by either of the standard photographic processes known as "projection printing" or "contact printing."

The resulting negative after development is illustrated in Figure 2 of the drawings, and is designated by the numeral 18. When the resulting negative 18 is developed, the lines which have been inked on the material 11 appear as transparent lines whereas the rest of the developed negative is opaque, as can be seen from a comparison of Figures 1 and 2. Such developed negative 18 serves as a master copy since it may be used with different aerial photographs and different survey data and information, as will be apparent from the following description.

Figure 3:
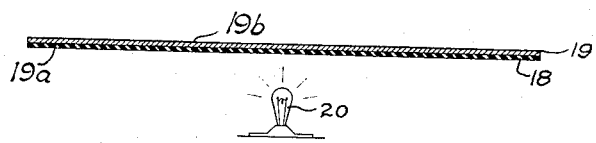
Figure 3 is a view partly in section and partly in elevation illustrating the exposure of the master copy of Figure 2 in contact with a photographic negative.

The next step of the process is illustrated in Figure 3, such step being carried out in the confines of a dark room. A photographic negative material 19 is placed on the master copy 18, with the photographic negative 19 being of the same size as the master copy 18. The photographic negative material 19 is provided with an emulsion-treated or light sensitive side 19a while the opposite side 19b has a surface capable of being marked upon. In reproducing the indicia of the master copy on the negative material 19, a light source 20 is disposed so that the light passes through the transparent lines on the master copy 18 to the negative 19. It is noted that the light sensitive side 19a of the negative is nearest to the light source so that the light rays will not have to pass through the material of the negative before striking the emulsion. Such arrangement locates the image so that it may be viewed in correct relationship when viewing the reproduction from the side 19b. The opaque portions of the master copy 18 do not permit light to pass therethrough, so that the negative 19 is exposed only to the light passing through the transparent lines of the master copy 18. During such exposure, the negative 19 has its emulsion side 19a facing downwardly and in contact with the master copy 18. The other side 19b of the negative material is facing upwardly or away from the master copy 18 and such surface 19b preferably is relatively rough such as a matted surface texture or any other type of surface which is capable of holding ink, such as cellulose acetate ink, after the negative material 19 has been developed.

After the negative material 19 has been exposed as shown in Figure 3, it is then placed in a light-proof packet, or otherwise protected from light. Thereafter the negative material 19 is again placed in a dark room with its packet removed to carry out the next step illustrated in Figure 4 in which a prepared strip of matched photographs 22 are placed upon a wall 23 or a similar support within the dark room. The photographic negative 19 is disposed directly opposite the aerial photographic strip 22 in the dark room, with the negative 19 being supported by another wall or suitable support (not shown). To prevent re-exposure of the portions of the negative 19 which have previously been exposed to the light through the transparent lines of the master copy 18, a mask or opaque cover 25 is provided. Such cover 25 is generally rectangular in shape and covers the outer border portions of the negative 19 which have been previously exposed in the steps illustrated in Figure 3. As will be explained, in some instances it may be desirable to position between the photographic negative 19 and the mask 25 a photolithographic or contact screen 26. Between and spaced from, the aerial photographic strip 22 and the mask 25 there is disposed a lens 28 on a suitable support 29 which is movable between the aerial photograph strip 22 and the negative 19 in order to focus the image of the aerial photographic strip within the confines or central portion defined by the mask 25. Thus, the scale of the aerial photographic strip 22 photographically projected to the negative 19 by the lens 28 can be regulated by the proper focusing of the lens 28. After the lens 28 has been located to provide the proper focus (the focus lines being indicated by the dash lines in Figure 4), the aerial photograph strip 22 is then lighted by a light source (not shown) to thereby expose the negative 19 at the central portion within the mask 25. During such exposure the emulsion side 19a of the negative 19 faces the aerial photograph 22, so that the final reproduction may be viewed from the side 19b. Whether or not the photolithographic screen 26 is utilized will depend upon the method of reproduction of the final alignment sheet 10. If it is desired to reproduce the final aerial alignment sheet 10 by a dry method of printing (for example, the "Ozalid" method), the photolithographic screen 26 can be used. If the reproduction is to be by the conventional blue-printing method, the screen 26 may or may not be used.

After the exposure of the photographic negative 19 to the aerial photograph 22 (Figure 4), the negative 19 then has been exposed to the lines representing the border 12, title block 14, data columns 15 and 16, and other information not illustrated (such lines and other information appearing on the master copy shown in Figure 2) as well as the aerial photograph 22. Then the negative 19 is developed so that the intermediate alignment sheet 30 illustrated in Figure 5 is produced. The intermediate alignment sheet 30 is actually the negative 19 after it has been exposed as illustrated in Figures 3 and 4 and then developed. Since the developed intermediate alignment sheet or negative 30 is transparent except at such portions as may have received a photographic image (as illustrated by Figures 3 and 4), the sheet 30 may be used with the emulsion side 19a downwardly, so that the matted surface texture side 19b may be utilized for inking purposes.

Assuming then that the intermediate aerial alignment sheet 30 has been made, it can be determined from the developed photographic image 31 of the aerial photograph 22 the various ground conditions which exist in the area through which the cross-country construction is to be made. The pipeline can be laid out by the draftsmen so as to avoid any natural obstacles in the terrain which appear on the aerial photograph portion 31. Also, natural boundary lines or boundary markers which appear on the aerial photograph 31 will indicate areas or tracts under common ownership and also any small tracts of land which may be avoided in laying out the pipeline. Thus, the pipeline can generally be laid out by the draftsmen without the necessity of sending out an initial survey crew to determine ownership rights. After the proposed pipeline is laid out by inking on the surface 19b of the sheet 30, then the personnel engaged in acquiring rights-of-way can be sent out to obtain the necessary permission to run the survey and construct the pipeline. In the event that rights-of-way cannot be obtained for all of the property over which the proposed pipeline has been laid out, the ink lines used for representing the pipelines can readily be erased or removed without damaging the emulsion, because such emulsion is on the opposite side of the sheet 30 on which the ink is placed. When the rights-of-way are obtained, then the survey party may be supplied with a copy of the aerial alignment sheet having the proposed pipeline laid out thereon. The copies may be made by either the blue-print or the "dry" method of printing (an example of which is the "Ozalid" method), both of which are well known, so that a very economical method of distribution for the large number of copies required is effected. Furthermore, the persons using the copies do not have to be concerned about the accuracy of the alignment of the proposed pipeline on the aerial photograph as would be the case if the aerial photograph were separate from an overlay sheet or sheets having the pipeline and other data thereon.

When the surveying party completes its information, the final alignment sheet 10 is drawn up by the draftsmen (Figure 6), which includes the survey and ownership data 32 which is inked on the side 19b just as is the pipeline 33. The final aerial alignment sheet 10 therefore includes all of the information necessary for the final survey and for a permanent record. The number of inexpensive copies which can be reproduced from the final aerial alignment sheet 10 by the blue-printing or "dry" printing methods (for example, the "Ozalid" method), makes the aerial alignment sheet of this invention very economical as compared to previously known methods of making alignment sheets.

It is believed evident from the above description that an aerial alignment sheet and the method of making the same has been provided which offers numerous advantages over the prior alignment sheets and methods of making them, particularly as to cost, accuracy and ease of handling. Although this invention has been described in connection with the preparation of an alignment sheet for the cross-country construction of a pipeline, it will be appreciated that the invention can be likewise applied to various other industries such as those concerned with the construction of highways, railroads, electric transmission lines, telephone lines, and similar facilities.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. The method of preparing an aerial alignment sheet from a translucent light sensitive photographic element having one side provided with a photo-sensitive emulsion and its opposite side provided with a surface adapted to receive indicia, comprising the steps of, making a first mask opaque except for transparent indicia on a border portion along at least one edge of said opaque portion for forming border indicia on said photographic element upon exposure thereof to light, said first mask being of the same size as the photographic element to be exposed to an aerial photograph, printing said border indicia on said photographic element with said first mask in contact with the emulsion side of said photographic element, removing said first mask, preparing a second mask the same size as said photographic element and with an opaque portion corresponding to the area of said border indicia and with a second portion thereof which passes light in image form therethrough, placing said second mask in contact with said emulsion side of said photographic element, projecting the image of an aerial photograph through said second mask in such manner as to produce an image record on the emulsion side of said photographic element which when viewed from the side opposite the emulsion shows the terrain in said aerial photograph as such terrain would appear when viewed from the air, thereafter developing the entire photographic element, drying the developed photographic element, then placing indicia on that side of the developed photographic element which is opposite to the emulsion side and overlying said image record of the aerial photograph, said indicia being representative of a cross-country route traversing the terrain shown in the aerial photograph and being so placed on said photographic element, and placing other indicia on said photographic element in proximity to the border indicia of said photographic element and on the side opposite from said emulsion, said other indicia being correlated to the indicia overlying said image record of the aerial photograph and to said border.

2. The method of preparing an aerial alignment sheet from a translucent light sensitive photographic element having one side provided with a surface adapted to receive indicia, comprising the steps of, making a first mask opaque except for transparent indicia on a border portion for forming border indicia on said photographic element upon exposure thereof to light, said first mask being of the same size as said photographic element, printing said border area on said photographic element with said first mask in contact with the emulsion side of said photographic element, removing said first mask, preparing a second mask the same size as said photographic element and with an opaque portion having an area which at least corresponds to the area of said border indicia and with a central portion thereof which passes light in image form therethrough, placing said second mask in contact with said emulsion side of said photographic element, projecting the image of an aerial photograph through said second mask in such manner as to produce an image record on the emulsion side of said photographic element which when viewed from the side opposite the emulsion shows the terrain in said aerial photograph as such terrain would appear when viewed from the air, thereafter developing the entire photographic element, drying the developed photographic element, then placing indicia on that side of the developed photographic element which is opposite to the emulsion side and overlying said image record of the aerial photograph, said indicia being representative of a cross-country route traversing the terrain shown in the aerial photograph and being so placed on said photographic element, placing other indicia on the border area of said photographic element and on the side opposite from said emulsion, said other indicia being correlated to the indicia overlying said image record of the aerial photograph and to said border indicia, and thereafter reproducing multiple copies of said photographic element.

3. The method of preparing an aerial alignment sheet from a translucent light sensitive photographic element having one side provided with a photo-sensitive emulsion and its opposite side provided with a surface adapted to receive indicia, comprising the steps of, making a first mask opaque except for transparent configurations on a border portion along at least one edge of said opaque portion for forming border configurations on said photographic element upon exposure thereof to light, said first mask being of the same size as said photographic element, printing said border area on said photographic element with said first mask in contact with the emulsion side of said photographic element, removing said first mask, preparing a second mask the same size as said photographic element and with an opaque portion corresponding to the area of said border area and with a second portion thereof which passes light in image form therethrough, placing said second mask in contact with said emulsion side of said photographic element, projecting the image of an aerial photograph through said second mask in such manner as to produce an image record on the emulsion side of said photographic element which when viewed from the side opposite the emulsion shows the terrain in said aerial photograph as such terrain would appear when viewed from the air, thereafter developing the entire photographic element, drying the developed photographic element, then placing indicia on that side of the developed photographic element which is opposite to the emulsion side and overlying said image record of the aerial photograph, said indicia being representative of a cross-country route traversing the terrain shown in the aerial photograph and being so placed on said photographic element, and placing other indicia on the border area of said photographic element and on the side opposite from said emulsion, said other indicia being correlated to the indicia overlying said image record of the aerial photograph and to said border configurations.

4. The method of preparing an aerial alignment sheet from a translucent light sensitive photographic element having one side provided with a photo-sensitive emulsion and its opposite side provided with a surface adapted to receive indicia, comprising the steps of, making a first mask opaque except for transparent configurations along at least one border portion, printing said configurations on said photographic element with said first mask in contact with the emulsion side of said photographic element, removing said first mask, preparing a second mask the same size as said photographic element and with an opaque portion corresponding to the area of said border area and with a second portion thereof which passes light in image form therethrough which corresponds in size to the opaque portion of said first mask, placing said second mask in contact with said emulsion side of said photographic element, projecting the image of an aerial photograph through said mask in such manner as to produce an image record on the emulsion side of said photographic element which when viewed from the side opposite the emulsion shows the terrain in said aerial photograph as such terrain would appear when viewed from the air, thereafter developing the entire photographic element, drying the developed photographic element, then placing indicia on that side of the developed photographic element which is opposite to the emulsion side and overlying said image record of the aerial photograph, said indicia being representative of a cross-country route traversing the terrain shown in the aerial photograph and being so placed on said photographic element, and placing other indicia on the border area of said photographic element and on the side opposite from said emulsion, said other indicia being correlated to the indicia overlying said image record of the aerial photograph and to said configurations.

References Cited in the file of this patent

UNITED STATES PATENTS

| Number | Name | Date |
|---|---|---|
| 1,102,903 | Gamble | July 7, 1914 |
| 1,232,359 | Miller | July 3, 1917 |
| 1,546,784 | Hottman | July 21, 1925 |
| 1,597,727 | Sperati | Aug. 31, 1926 |
| 1,631,421 | Lohofer | June 7, 1927 |
| 1,734,780 | Simjian | Nov. 5, 1929 |
| 1,933,953 | Ames | Nov. 7, 1933 |
| 2,473,174 | Pifer | June 14, 1949 |